Sept. 25, 1928.
E. A. F. PUNGA
1,685,094
METHOD AND DEVICE FOR BALANCING ROTATING MACHINE PARTS
Filed March 26, 1921
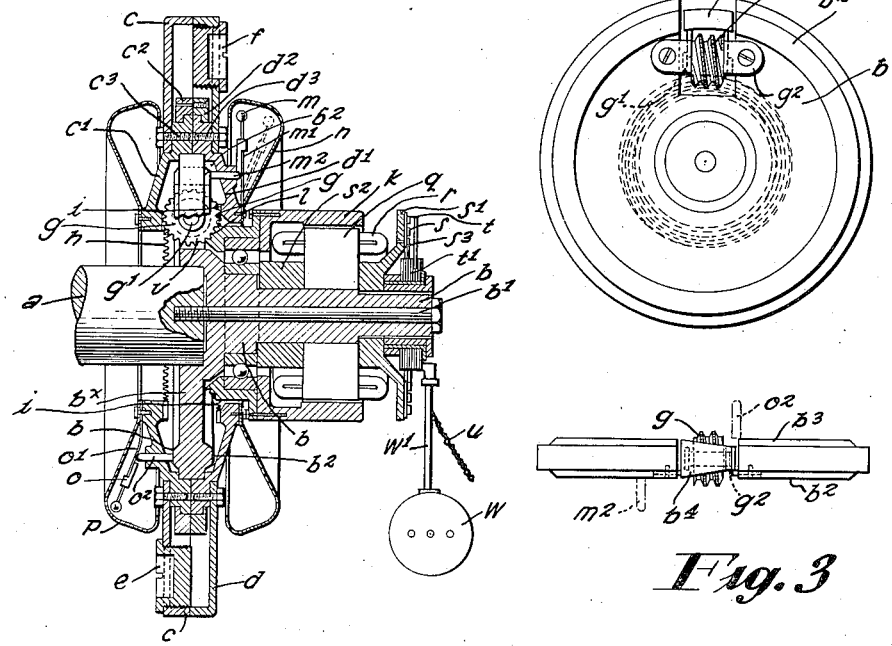

Patented Sept. 25, 1928.

1,685,094

UNITED STATES PATENT OFFICE.

EDWIN ALWIN FRANKLIN PUNGA, OF MULHEIM-ON-THE-RUHR, GERMANY.

METHOD AND DEVICE FOR BALANCING ROTATING-MACHINE PARTS.

Application filed March 26, 1921, Serial No. 456,036, and in Germany April 1, 1919.

This invention relates to methods and devices for balancing rotating machine parts by means of eccentric compensating masses or weights added to the machine parts and adapted to be regulated during the running of the same. To enable the magnitude of the force that is produced by the additional eccentric weight (which counter-balances the unbalancing forces) to be continuously altered at will whilst its direction is changing, two eccentric masses associated with the machine part are turned at different angular velocities round the axis of the said part until the vibrations of this part are reduced to a minimum. The effects of the two additional masses, which rotate with the machine part at different angular velocities, and by which the balancing of the said part is accomplished, unite in a resultant force the magnitude and direction of which assume, during the shifting of the said masses, all the values necessary for the balancing operation, so that the direction of the resultant force revolves several times round the axis of the machine part, and whilst thus revolving the magnitude of the said force grows steadily from zero to a maximum value, and then drops to zero.

The two eccentrically mounted additional or compensating masses are preferably arranged upon disk-shaped bodies, which have been previously balanced, and are adapted to turn loosely on the machine part to be balanced, and engage through the medium of gearing of different speed ratios with a driving member mounted in the machine part. This driving member transmits the rotary motion of the machine part to the bodies with which the compensating masses are associated, and is adapted to rotate these bodies at different speeds around the axis of the said machine part.

The invention is illustrated in the drawing in which

Fig. 1 is a longitudinal section through one constructional form of the novel balancing device, Fig. 2 is a fractional side view of the device, Fig. 3 is a top view of Fig. 2, Fig. 4 shows the driving and displacing member of the device on an enlarged scale, Figs. 5$^a$ to 5$^t$ are diagrammatic representations of the effects produced by altering the relative positions of the additional or compensating masses, and Fig. 6 is a perspective view (partly in section) illustrating the manner in which the novel balancing device may be associated with the machine part to be balanced by it.

The balancing device shown in Fig. 1 is fixed on the shaft $a$ of the rotating machine part to be balanced by means of a hub $b$ and a pressure screw $b^1$. One end of the hub is provided with a disc-like flange $b^x$ as shown. Mounted side by side on the flange of the hub $b$ of the balancing device are two disks $c^1$, $d^1$ of similar construction which are mounted so as to have the same center of rotation as the shaft $a$ and are held together by stepped rings $c^2$, $d^2$. Secured to the disc $c^1$ by means of screws $c^3$ is an annular member $c$, and a similar member $d$ is similarly secured in position on the disc $d^1$. The member $c$ carries a removable compensating weight $e$, and a similar weight $f$ is carried by the member $d$. Mounted in the hub $b$ is a driving member $g$ which consists of a worm that engages on its opposite sides with two circles of teeth $h$ and $i$ of the disks $c^1$ and $d^1$ respectively, the teeth in the latter circle $i$ being more numerous than those in the circle $h$. A third disk or ring $k$ whose centre of rotation also coincides with that of the shaft $a$ is also mounted on the hub $b$ and carries on its inner upwardly inclined surface a spiral flange $l$ adapted to mesh with parallel grooves $v$ in the worm of the driving member $g$, which grooves extend in a direction approximately parallel to the longitudinal axis of the worm $g$.

In the constructional form shown in Fig. 6 the shaft $a$, which carries the body or machine part $a^1$ to be balanced, is journalled in two bearings $x^1$ and $x^7$ carried upon a foundation or base plate $x$ of any suitable kind and the balancing device ($c, d, k$) is mounted on that end of the shaft $a$ which projects beyond the bearing $x^1$. The bearing $x^1$ is adapted to reciprocate laterally in its upright support or pedestal. Springs $x^3$, or any other suitable elastic members, normally retain the bearing in its central position. The other bearing $x^7$ is adapted to oscillate in its support $x^8$ on a vertical axis $y$—$y$. By this arrangement the entire rotating part is enabled to swing to and fro periodically on the axis $y$—$y$ in a plane intersecting the said axis. The rotating parts may be driven by any suitable source of power, as for example an electric motor $z$ through the medium of an elastic shaft or an elastic coupling. The part to be balanced may however be journalled and driven in any other desired manner. The balancing operation may, for example, be carried out in the frame or casing of the machine to which the part to be balanced belongs, and the balancing device itself may be mounted on the shaft of the part to be balanced in any other suitable manner.

When the shaft $a$, and with it the hub $b$, Fig. 1, is rotated the driving member $g$ mounted in the hub acts as a carrier and transfers the rotary motion of the shaft to the disks $c^1$, $c$ and $d^1$, $d$ and through these disks to the compensating masses $e$ and $f$. As long as the driving member $g$ does not rotate on its own axis the positions of the disks $c$ and $d$ on the weights $e$ and $f$, with respect to the shaft $a$ of the part to be balanced will remain unchanged. But if the motion of the ring $k$ with its spiral flange $l$ is retarded by the application of a brake or by any other means, the flange $l$ will slide in the gaps or grooves $v$ and cause the driving member $g$ to rotate on its own longitudinal axis, and the worm of the driving member, which is in mesh with the circles of teeth $h$ and $i$, will impart rotary movements to the disks $c$ and $d$ and the associated compensating masses $e$ and $f$ which will be added to the rotary motion that they execute in common with the shaft $a$ and the machine part $a^1$ and the angular velocities of these additional movements will differ in proportion to the difference between the numbers of teeth on the circles $h$ and $i$.

The retarding or stopping of the ring $k$ may be accomplished by applying the hand, a brake band or any other suitable member to the periphery of the ring $k$. A preferred arrangement consists in constructing the ring $k$ in the manner illustrated in Fig. 1 according to which it is made in the form of an armature of an electric motor, as of a polyphase motor. Iron laminae $q$ in which a polyphase winding $r$ is embedded, are attached to the hub $b$.

Slip rings $s$ are arranged on a flat ring $s^1$ that is integral with a bushing $s^2$ that carries the laminated iron $q$ keyed onto the hub $b$. Brushes $t$ held in a brush-holder $t^1$ wipe against the slip rings $s$. The brush-holder $t^1$ turns freely upon the hub $b$ and is always kept in the same position by a weight $w$ suspended by a rod $w^1$. Three phase current is conducted by the wires $u$, the brushes $t$, the slip rings $s$ and the connections $s^3$ into the windings $r$ by which a torque is produced in a known manner that is exerted by the armature on the ring $k$ and causes this ring to turn on the rotating hub $b$ in the desired direction. This additional turning movement of the ring $k$ causes the driving member $g$ to revolve on its longitudinal axis and supplementary rotary movements are thus imparted to the disks $c$ and $d$ carrying the compensating masses $e$ and $f$. By reversing one of the phases of the three phase current the direction of the supplementary rotary movements of the compensating masses may be reversed so as to facilitate the adjustment of the masses $e$ and $f$ to their most favorable positions. If, after the most favorable positions of the masses $e$ and $f$ (i. e. the position in which the vibration of the rotating masses is reduced to a minimum) have been reached, any further unintentional movements of these masses during the stoppage of the machine are to be avoided, this may be accomplished by sending continuous current into the winding $r$ of the device.

While an electric motor is illustrated as the means for producing a torque between the hub and the ring $r$, and a relative motion of the compensating masses $e$ and $f$, said operations may be performed by any other known means.

Excepting the compensating masses $e$ and $f$ the device is perfectly balanced with respect to the axis of rotation of the shaft $a$. If, at the beginning of the balancing operation, the compensating masses $e$ and $f$ are in diametrically opposite positions as shown in Fig. 1, the centrifugal forces E and F (Fig. 5$^a$) produced by these masses being of equal magnitudes and opposed to each other, they will not affect the vibrations that are set up by the unbalanced mass of the machine part $a^1$. But if, whilst the machine part $a^1$ and the entire device is rotating, the ring $k$ is retarded and an additional or compensatory gradual continuous displacement, or, if preferable, a number of successive complementary displacements or rotary movements are imparted to the disks $c$ and $d$ so that the positions of the compensating masses $e$ and $f$ in relation to each other and to the machine part itself are gradually changed, the resultant centrifugal force R produced by the compensating masses will change both in magnitude and direction with respect to the shaft $a$ or the machine part $a^1$, five of the phases through which these changes pass being diagrammatically illustrated in Figs. 5$^a$ to 5$^e$, whilst the spiral curve of Fig. 5$^f$ shows all the different values and directions through which the resultant centrifugal force R passes from zero to a maximum. Thus the effect on the machine part of the two compensating masses $e$ and $f$, whose direction with respect to the machine part continuously changes, and which, in travelling round a circle, gradually approach each other, is that of a radial force R which not only gradually grows from zero to the maximum sum of the two component centrifugal forces, but also continually changes its radial direction, and if this force R is represented as a vector with its axis at $a$ (Fig. 5$^f$) the end A of the vector will describe a spiral curve around the zero point $a$.

If it is found by the balancing operation that the size of the resultant force must correspond to the value $aA$ (Fig. $5^f$) in order to reduce the vibration of the machine part to a minimum, it will be necessary, if the two compensating masses $e$ and $f$ are to be substituted by a single mass or weight, to make the size and position of this weight such that its centrifugal force will correspond in size and direction to the value $aA$.

Hence the balancing operation is performed in the following manner:

The shaft $a$ and the machine part $a^1$ to be balanced are rotated by the motor $z$ (Fig. 6), whilst the initial relative positions of the compensating masses $e$ and $f$ in the disks $c$ and $d$ respectively are those of Fig. 1. When the vibrations that the unbalance of the machine part $a^1$ cause it to execute have fully developed, the masses $e$ and $f$ are displaced with respect to the machine part by retarding the ring $k$ or displacing it on the shaft $a$, the displacement of the masses $e$ and $f$ being caused to take place sufficiently gradually to give the vibrations of the rotating machine part time to assume the value that corresponds to the magnitude and position of the resultant force $R$. The nearer this force approaches the position of compensation in which the vibrations are reduced to a minimum, the lower the angular velocity at which the compensating masses $e$ and $f$ are moved in relation to the machine part $a^1$ should be, i. e. the smaller the amount of relative rotary movement imparted to the ring $k$ should be.

From Fig. $5^f$ it is obvious that the resultant force $R$ assumes every possible direction and also every value ranging from zero to double the magnitude of the centrifugal force of one of the compensating masses. But the magnitudes of the resultant force $R$ that can be exerted in any one direction differ from each other by the amounts corresponding to the distances between neighbouring points of the spiral curve (Fig. $5^f$) lying on the particular radial line contemplated. Hence it will not as a rule be possible to completely eliminate the vibration of the machine part, but it can be reduced to value sufficiently small for practical purposes. The exactness of the balancing operation may be enhanced to any degree of nicety by substituting the compensating masses used for a rough initial elimination of the vibration by another pair of much lighter compensating masses which would have the effect of bringing the individual coils of the spiral in the diagram of forces, Fig. $5^f$, much closer together.

During the operation of continuously displacing the ring $k$ it will be advantageous to indicate the positions in which the masses $e$ and $f$ are located at each moment, or at least some of these positions, by signals, as for example by a gong. When the mass $f$ is moved through a certain angle with respect to the shaft $a$ of the machine part a hammer $m$ (Fig. 1) may be caused to strike against a casing $n$ which in the embodiment of the invention illustrated in Fig. 1 encircles the open end of the disc $d^1$. In the same way a similar hammer $o$ will strike against a gong $p$ when the mass $e$ is moved into a certain position on the shaft $a$. The hammers $m$ and $o$ are operated by their elastic stems $m^1$ and $o^1$ engaging pins $m^2$ and $o^2$ which are guided in holes in the disks $d^1$ and $c^1$ respectively. The inner ends of the pins $m^2$ and $o^2$ are pressed against and wipe raised annular surfaces $b^2$ and $b^3$ respectively of the hub $b$. The annular surfaces or tracks $b^2$ and $b^3$ are interrupted on the point where the worm $g$ is mounted in the hub and the gap is filled by a wedge-shaped intermediate piece $b^4$ (Figs. 2 and 3). Each time a pin $m^2$ or $o^2$ reaches the gap containing the intermediate piece $b^4$ it slips off the track $b^2$ or $b^3$ onto the intermediate piece $b^4$ and the hammer stem $m^1$ or $o^1$ causes the hammer head $m$ or $o$, as the case may be, to strike against the inner surface of the gong $n$ or $p$. The interval between two sounds of the gong $n$ thus represents a full turn of the mass $f$ about the shaft $a$, and the same applies to the gong $p$ with respect to the compensating mass $e$. Now if it is found with the aid of a watch that the moment at which the smallest amount of vibration occurs is reached a certain number of seconds after the sounding of the gong $n$, the ratio of this number of seconds to the number of seconds required for a total turn will be a measure for determining the angle which the compensating mass $f$ turns through from the angular position indicated by the sounding of the gong up to the moment of the smallest vibration. In a similar manner the most favorable position of the mass $e$ can be determined. If for example 240 seconds pass between two strokes of the gong and the most favorable position of the mass $f$ (i. e. the position of smallest vibration) is reached in 120 seconds the compensating mass $f$ will have to be shifted 180° from the position in which the gong $p$ is struck. The gongs belonging to the different compensating masses will preferably be adapted to give different sounds.

To enable the above-described balancing method to be employed it is necessary that the time in which the compensating mass makes a revolution with respect to the shaft $a$ be long enough to make the time in which the vibrations follow up when the position of the said mass is changed small enough to be negligible, for otherwise a small correction to eliminate the error that would occur would have to be applied.

Instead of the gong signalling device illustrated, the signals may be made in any other known manner.

Another feature of the invention may consist in a device for recording the vibrations which occur, upon a moving surface, as for example upon a disk mounted on the shaft $a$ or preferably on an endless paper band (see Fig. 6). To this end a double arm lever $x^5$ pivoted on the bearing support, is linked to a guide rod $x^4$, and the free end $x^6$ of the lever $x^5$ is equipped with a stylus which records the vibrations on a paper band B which is gradually paid out by a roll D, and is wound on a roll C driven by a motor $C^1$ of any suitable kind.

I claim:

1. A method of balancing rotating bodies, which comprises mounting the body to be balanced on a yielding support whereby the former may vibrate, mounting balancing weights off the axis of rotation of and for coaxial rotation with said body, rotating the latter and rotating the weights at different speeds relative to the speed of rotation of the body, so that the change of position of both weights with respect to the body is simultaneous and automatic with the change in their relative position one to the other.

2. A method of balancing rotating bodies, which comprises mounting the body to be balanced on a yielding support whereby the former may vibrate, mounting balancing weights off the axis of rotation of and for coaxial rotation with said body, rotating the latter and simultaneously rotating the weights at different speeds relative to each other and to the body so that the different angular displacements of the weights with respect to the body are contingent to one another.

3. A method of balancing a rotating body which comprises yieldingly mounting the body whereby the same may partake of a gyratory movement, providing unbalanced elements for conjoint rotation about the axis of rotation of said body, rotating the body and rotating the elements relatively to the body and relatively to each other so that the change in the magnitude of the force produced by said weights is simultaneous and automatic with the change in its direction.

4. A method of balancing a rotating body which comprises yieldingly mounting the body whereby the same may partake of a gyratory movement, providing unbalanced elements for conjoint rotation about the axis of rotation of said body, rotating the body and rotating the elements relatively to the body and to each other to cause the resultant force produced by said elements to travel continuously about said axis, whilst its magnitude is automatically and continuously changing from zero to a maximum equal to the sum of the two weights.

5. A method of balancing a rotating body which comprises yieldingly mounting the body whereby the same may produce an unbalanced force in a certain direction relative to said body, securing unbalanced elements in liaison with the body so as to have unlimited conjoint rotation about a common axis therewith, rotating the body and simultaneously rotating the elements at different speeds relative to each other, to cause the resultant force produced by said elements and perpendicular to the axis of rotation to rotate continuously about said axis, whilst its magnitude is automatically and continuously changing from zero to a maximum, so as to have its direction travel many times past a point on said body 180 degrees from the unbalanced force produced by said body and its magnitude increase by a certain amount, each time it passes said point.

6. The method of dynamic balancing which comprises mounting the body to be balanced on a yielding support whereby it may vibrate, loosely mounting a pair of normally diametrically opposed elements carrying compensating weights on the body so that they will have unlimited rotation about an axis in alinement with that of the body being tested, rotating the body, placing the elements in liaison with the body whereby the former will rotate with the latter, and revolving said elements relative to the body and to each other, so that angular displacements of said elements with respect to the body are simultaneously made and contingent to one another.

7. The method of dynamic balancing which comprises mounting the body to be balanced on a yielding support whereby it may vibrate, loosely mounting a pair of normally diametrically opposed elements carrying compensating weights on the body so that they will have unlimited conjoint rotation with the body being balanced, rotating the body, placing the elements in liaison with the body whereby the former will rotate the latter, and revolving said elements at different speeds relative to each other and to the body so that changes in position of both elements with respect to the body are automatic with changes in their position relative to one another.

8. An apparatus of the character described comprising a device adapted to be carried by a rotating body to be balanced, a pair of axially alined elements rotatably mounted in different parallel planes on the device and coaxially with the body being balanced or tested, means for establishing a liaison between the elements and the device whereby said elements may rotate with the device, and means for revolving the elements relatively to the device while rotating with the same comprising angular displacements of said elements with respect to the body contingent to one another.

9. An apparatus of the character described comprising a device adapted to be carried by a rotating body to be balanced, a pair of axially alined elements loosely mounted thereon for conjoint rotation about a common axis, means for establishing a liaison between the elements and the device whereby said elements may rotate with the same and further means for revolving the elements at different speeds relative to the device and to each other while rotating with the same, comprising angular displacements of said elements with respect to the body automatic with changes in their relative position one to the other.

10. An apparatus of the character described comprising a device adapted to be carried by a rotating body to be balanced, a pair of axially alined elements, each carrying a compensating weight, rotatably mounted coaxially in different planes on the device so as to have unlimited angular movement, means for establishing a liaison between the elements and the device whereby said elements may rotate with the same and further means for revolving the elements simultaneously relative to the device and to each other whereby the resultant force produced by said elements will change in magnitude proportionally to and automatically with its angular displacement with respect to the body.

11. An apparatus of the character described comprising a device adapted to be carried by a rotating body and be rotated thereby, a pair of axially alined elements rotatably mounted coaxially on the device, balancing weights carried on the elements in spaced planes perpendicular to their axis of rotation, actuating connections between the device and elements for rotating the latter with the device and the body and further driving mechanism for the elements actuated independently of the rotating body.

12. An apparatus of the character described, comprising a device adapted to be attached to a rotating body, a pair of axially alined elements loosely mounted on the device in axial alinement with the element and the body, a range of gear teeth on each element, one of said ranges having a greater number of teeth than the other range, a member carried by the device and engaging the teeth of both elements, and means whereby the engagement of the member with the teeth will cause the elements to revolve relatively to the device.

13. An apparatus of the character described, comprising a device adapted to be attached to a rotating body, a pair of axially alined elements loosely mounted on the device in axial alinement with each other and the body, a range of gear teeth on each element, one of said ranges having a greater number of teeth than the other range, said ranges being opposed, a worm carried by the device and engaging the teeth of both elements, and means for rotating the worm on its axis to cause the elements to revolve relatively to the device.

14. An apparatus of the character described, comprising a device adapted to be attached to a rotating body, a pair of axially alined elements loosely mounted on the device in axial alinement with each other and the body, a range of gear teeth on each element, one of said ranges having a greater number of teeth than the other range, said ranges being opposed, a worm carried by the device and engaging the teeth of both elements, and means for rotating the worm on its axis to cause the elements to revolve relatively to the device, and means for indicating the relative movements of the elements.

15. An apparatus of the character described, comprising a device adapted to be rigidly attached to a rotating body, a pair of elements rotatably carried on the device, a compensating weight carried by each element, a crown gear on each element, said gears being spaced apart and opposed, a worm rotatably mounted on the device and engaging both gears whereby when the body is rotated the said body, device, elements and worm will rotate as an entirety, said worm being provided with gear teeth extending substantially parallel to the axis of the worm, and a member engaging said last mentioned gear teeth for rotating said worm on its axis, the rotation of the worm causing the elements to revolve relatively to the device.

16. In a device of the character described, the combination with the shaft of the device to be balanced, of a body member affixed to the shaft in axial alinement therewith, a pair of axially alined elements rotatably mounted on the body coaxially therewith, balancing weights supported on the elements, actuating connections between the body and elements whereby the latter are driven in conjunction with the shaft, and mechanism for changing the speed of rotation of the elements relative to each other while rotating with the body member and independent of the rotation of the latter so that angular displacements of the elements with respect to the body are automatic with displacements of the elements relative to one another.

17. In a device of the character described, the combination with a system to be balanced including a rotary shaft, of a balancing device mounted on the shaft in axial alinement therewith, a pair of rotatable discs mounted in axial alinement coaxially on the device, balancing weights supported on the discs in spaced planes transverse to the axis of the device, actuating connections between the device and discs causing the latter to rotate with the former during the rotation of the shaft, and driving mechanism for changing the rate of rotation of the discs to cause them to move at different speeds relative to each other and to the shaft.

In testimony whereof I affix my signature.

E. A. FRANKLIN PUNGA.